US008552620B2

(12) United States Patent
Yano et al.

(10) Patent No.: US 8,552,620 B2
(45) Date of Patent: Oct. 8, 2013

(54) METHOD OF MEASURING AND EVALUATING MECHANICAL OUTPUTS OF PIEZOELECTRIC ACTUATORS, CONTROLLING METHOD OF THE SAME, AND APPARATUS USING THOSE METHODS

(75) Inventors: Takeshi Yano, Kanagawa (JP); Kazuo Yakuwa, Kanagawa (JP); Akio Yano, Kanagawa (JP); Sze Keat Chee, Kanagawa (JP); Toshiro Higuchi, Tokyo (JP)

(73) Assignee: Mechano Transformer Corporation, Kawasaki (JP)

( * ) Notice: Subject to any disclaimer, the term of this patent is extended or adjusted under 35 U.S.C. 154(b) by 110 days.

(21) Appl. No.: 13/260,180

(22) PCT Filed: Mar. 31, 2010

(86) PCT No.: PCT/JP2010/055800
§ 371 (c)(1),
(2), (4) Date: Dec. 23, 2011

(87) PCT Pub. No.: WO2010/114000
PCT Pub. Date: Oct. 7, 2010

(65) Prior Publication Data
US 2012/0091927 A1    Apr. 19, 2012

(30) Foreign Application Priority Data
Mar. 31, 2009    (JP) ................. 2009-084074

(51) Int. Cl.
*H01L 41/107*    (2006.01)
(52) U.S. Cl.
USPC ........................................ 310/318
(58) Field of Classification Search
USPC ............. 310/314, 316.01–316.03, 317, 318
See application file for complete search history.

(56) References Cited

FOREIGN PATENT DOCUMENTS

| JP | 2008-099399 A | 4/2008 |
| JP | 2008-145839 A | 6/2008 |
| WO | 2005/067346 A1 | 7/2005 |

OTHER PUBLICATIONS

Dosch, Jeffrey et al., "A Self-Sensing Piezoelectric Actuator for Collocated Control", Journal of Intelligent Material Systems and Structures, 1992; 3; 166, 21 pages.
Oshima, Kazuhiko, "Self-sensing Piezoelectric Actuation and Its Application", 'Institute of Systems, Control and Information Engineers', 2000, vol. 44, No. 5, pp. 281-288.
International Search Report, directed to International Patent Application No. PCT/JP20101055800, 2 pages including English translation.

*Primary Examiner* — Thomas Dougherty
(74) *Attorney, Agent, or Firm* — Smith Patent Office

(57) ABSTRACT

The present invention relates to a method of measuring and evaluating rigidity of a target object or mechanical output, such as force, displacement, and mechanical energy generated by a piezoelectric actuator and applied to the target object, according to only a measured value of electric quantity without use of a mechanical sensor, and a method of controlling the piezoelectric actuator, and a device using these methods.
Steps of finding equivalent circuit constants of the piezoelectric actuator; applying a voltage to the piezoelectric actuator and measuring electrical quantity flowing into the piezoelectric actuator due to the applied voltage, or applying an electric charge to the piezoelectric actuator and measuring voltage applied to the piezoelectric actuator due to the applied electric charge; and measuring and evaluating one or more of force, displacement, or mechanical energy generated by the piezoelectric actuator and applied to a target object, or rigidity of a target object are included. While these values are measured and evaluated minutely, applied voltage and electrical quantity are adjusted and controlled.

7 Claims, 5 Drawing Sheets

(electrical system)     (mechanical system)

(a)

(b)

METHOD OF MEASURING AND EVALUATING MECHANICAL OUTPUTS OF PIEZOELECTRIC ACTUATORS, CONTROLLING METHOD OF THE SAME, AND APPARATUS USING THOSE METHODS

TECHNICAL FIELD

The present invention relates to a method of measuring and evaluating rigidity of a target object or mechanical output, such as force, displacement, and mechanical energy generated by a piezoelectric actuator and applied to the target object, according to only a measured value of electric quantity without use of a mechanical sensor, and further relates to a method of controlling the piezoelectric actuator, and a device using these methods.

BACKGROUND ART

An actuator, which is a device for triggering various mechanical movements, is utilized in various fields from various industrial machinery, automobiles, aircrafts, medical equipment, to personal electric products.

Among these, a piezoelectric actuator that converts electric energy to mechanical energy utilizing the piezoelectric effect or the electrostrictive effect is widely used. Characteristics of the piezoelectric actuator are that conversion efficiency from electric energy to mechanical energy is high, it is small, control of minute displacement is easy, and an electric current is not effectively flowing when a voltage is applied so as to maintain a state of a given generated displacement, namely there is power consumption while the applied voltage is reached, yet there is no further power consumption when maintaining a uniform voltage thereafter. A constituent material of such a piezoelectric actuator may be crystal, a ceramic material, an organic polymer material such as polyvinylidene fluoride (PVDF) and the like.

FIG. 5 illustrates an exemplary piezoelectric actuator configured as a clamping mechanism. The clamping mechanism is structured so as to convert generated displacement of a multilayer piezoelectric actuator to mechanical movement of pinching an object. FIGS. 5(a) shows a state where a voltage is not applied to the multilayer piezoelectric actuator, and 5(b) shows a state of pinching a target object by applying a voltage to the multilayer piezoelectric actuator.

In the case of using such a piezoelectric actuator, detection of the state of force generated at the tip of the piezoelectric actuator is necessary. For example, in the case of configuring a clamping mechanism for a chip component mounting device, it is necessary to surely pick up with a force that overcomes the inertial force imparted on a chip component due to acceleration when moving the chip component. Moreover, in the case of pinching and moving a breakable object such as a wine glass or an egg, it is necessary to adjust the applied voltage so as to provide an appropriate force within a range of force, which can not break the target object even when the wine glass or the egg is moving where the inertial force is additionally imparted thereon. Furthermore, since generally there are fluctuations in dimensions of the target object, it needs to be structured so as to exert a predetermined force irrespective of degree of generated displacement of the piezoelectric actuator.

In order to exert such an appropriate force within the realm of conventional technology, it is necessary to use a force sensor that detects reactive force from the target object at the tip of the clamping mechanism, and adjust the applied voltage imparted on the piezoelectric actuator so that the value of the force sensor is a desired value. However, since a mechanical sensor such as a typical force sensor is expensive, and the force sensor must be placed between the clamping mechanism and the target object in order to incorporate the force sensor, which detects external force, into the clamping mechanism, the execution itself is often difficult.

The above problem may be resolved if estimation of generated force and generated displacement according to measured values of voltage and electrical quantity on the input side of the piezoelectric actuator can be substituted for incorporation of a displacement sensor or a force sensor. With this kind of objective, research of self-sensing actuation (denoted as SSA hereafter), which aims to simultaneously carry out sensing quantity of displacement and then carry out actuation accordingly, is being conducted (e.g., Non-Patent Document 1). SSA attempts estimation of generated displacement from voltage applied to the actuator, and strives for reduction in size and weight as well as low cost of a control system by sensing the quantity of displacement from the voltage without using a displacement sensor. SSA allows estimation of generated displacement in a state where there is no mechanical load, and estimation of force to be generated if a certain mechanical load is estimated. However, since only voltage is measured, quantity of two independent mechanical systems such as displacement and force is impossible. For example, according to SSA technology, if there are fluctuations in dimensions of the target object in the case of the aforementioned clamping mechanism, error in estimated generated force occurs.

PRIOR ART DOCUMENTS

Non-Patent Documents

[Non-Patent Document 1] Oshima, Kazuhiko, "Self-sensing Piezoelectric Actuation and Its Application", 'Institute of Systems, Control and Information Engineers', Vol. 44, No. 5, pp. 281-288, 2000

DISCLOSURE OF INVENTION

Problem to be Solved by the Invention

The present invention, in light of the current condition, aims to provide a method of easily and simultaneously measuring and evaluating force, displacement, and mechanical energy generated by a piezoelectric actuator and applied to a target object, and rigidity of the target object using equivalent circuit technology, a method of controlling the piezoelectric actuator using the measured and evaluated values, and a device using these methods.

Means of Solving the Problem

In order to reach the above objective, a mechanical output measurement and evaluation method for a piezoelectric actuator that mechanically expands and contracts to deform in response to applied voltage or electric charge utilizing the piezoelectric effect or the electrostrictive effect may be provided. It includes the steps of: finding equivalent circuit constants of the piezoelectric actuator including damping capacity, rigidity, and an electrical to mechanical conversion factor; applying a voltage to the piezoelectric actuator and measuring electrical quantity flowing into the piezoelectric actuator due to the applied voltage, or applying an electric charge to the piezoelectric actuator and measuring voltage applied to the piezoelectric actuator due to the applied electric charge;

and measuring and evaluating one or more of force, displacement, or mechanical energy generated by the piezoelectric actuator and applied to a target object, or rigidity of a target object using the equivalent circuit constants, the applied voltage, and the electrical quantity.

Note that in the step of finding the equivalent circuit constants of the piezoelectric actuator, the equivalent circuit constants may be found by being defined as a function of applied voltage applied to the piezoelectric actuator rising from zero, or a function of applied voltage to the piezoelectric actuator falling from a maximum voltage.

Alternatively, a mechanical output measurement and evaluation method for the piezoelectric actuator is provided according to the step of measuring and evaluating one or more of the force, the displacement, or the mechanical energy generated by the piezoelectric actuator and applied to the target object, or the rigidity of the target object, wherein equation $f=(C_d \cdot k/A+A) \cdot V - k \cdot Q/A$ is used for the force, equation $\xi=(Q \cdot C_d \cdot V)/A$ is used for the displacement, equation $E=\frac{1}{2} \cdot (Q - C_d \cdot V) \cdot \{(C_d \cdot k/A^2+1) \cdot V - k \cdot Q/A^2\}$ is used for the mechanical energy, and equation $K=\{(C_d \cdot k+A^2) \cdot V - k \cdot Q\}/(-C_d \cdot V+Q)$ is used for the rigidity of a target object (where f denotes force generated by the piezoelectric actuator and applied to the target object, $\xi$ denotes the displacement generated by the piezoelectric actuator and applied to the target object, E denotes the mechanical energy generated by the piezoelectric actuator and applied to the target object, K denotes the rigidity of the target object, V denotes the applied voltage, Q denotes the electrical quantity flowing into piezoelectric actuator, $C_d$ denotes the damping capacity, k denotes the rigidity of piezoelectric actuator, and A denotes the electrical to mechanical conversion factor).

Further alternatively, a piezoelectric actuator control method may be provided. It includes measuring and evaluating any one of force, displacement, or mechanical energy generated by the piezoelectric actuator and applied to a target object, or rigidity of the target object minutely, and controlling an applied voltage and electrical quantity such that the force, the displacement and the mechanical energy become desired values while changing the applied voltage or the electrical quantity according to the mechanical output measurement and evaluation method for the piezoelectric actuator.

Even further alternatively, a piezoelectric actuator control method where the piezoelectric actuator is structured so as to make a move of pinching an object in association with voltage or electric charge applied may be provided.

Moreover, a clamping device for pinching a target object using the piezoelectric actuator control method may be provided. It includes a piezoelectric actuator, and a device for applying a voltage to the piezoelectric actuator and measuring electrical quantity flowing into the piezoelectric actuator due to the applied voltage, or a device for applying an electric charge to the piezoelectric actuator and measuring quantity of voltage applied to the piezoelectric actuator due to the applied electric charge.

Furthermore, a rigidity monitoring device may be provided. It includes a piezoelectric actuator, a device for applying a voltage to the piezoelectric actuator and measuring electrical quantity flowing into the piezoelectric actuator due to the applied voltage, or a device for applying an electric charge to the piezoelectric actuator and measuring quantity of voltage applied to the piezoelectric actuator due to the applied electric charge. An end of the piezoelectric actuator makes contact with a target object, or the target object is pinched and held when the piezoelectric actuator makes a move of pinching the target object while a voltage or an electric charge is applied to the piezoelectric actuator, and rigidity of the target object is measured and evaluated using the mechanical output measurement and evaluation method.

Result of Invention

According to the piezoelectric actuator based on the present invention, excellent results that determination of equivalent circuit constants allows easy and simultaneous measurement and evaluation of all of force, displacement and mechanical energy generated by the piezoelectric actuator and applied to the target object, and rigidity of the target object according to values of applied voltage and electrical quantity are achieved even without separately providing a sensor for measuring mechanical quantity. Moreover, just by adjusting the applied voltage while measuring and evaluating these force, displacement, mechanical energy, and rigidity of the target object minutely, a result that the force and the like may be easily and simultaneously controlled to be desired values while sensing is achieved. A result that a clamping device using the mechanical measurement evaluation method and the control method and with which an external sensor is unnecessary and a rigidity monitoring device capable of easily measuring rigidity of a target object may be provided is also achieved.

BEST MODE FOR CARRYING OUT THE INVENTION

First, fundamental technology of the present invention is described. An electrical system and a mechanical system can be represented by the exact same form of a differential equation, and thus a phenomenon developing in the electrical system and that developing in the mechanical system have an analogical relationship, assuming there is an appropriate correspondence relation between electrical quantity and mechanical quantity. While there are several types of this assumed correspondence relation between electrical quantity and mechanical quantity, in the case of a piezoelectric actuator utilizing the piezoelectric effect according to the present invention, use of force-voltage correspondence for corresponding force to voltage, velocity to current, and displacement to electric charge allows presentation of electrical to mechanical conversion as a single ideal transformer, which is favorable.

Figure 1:
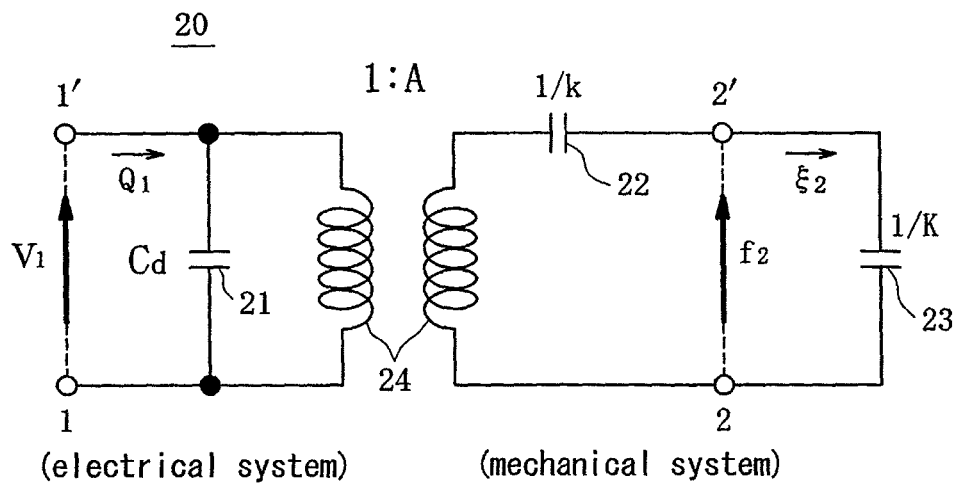
FIG. 1 is a diagram representing a piezoelectric actuator based on the present invention as an equivalent circuit.

FIG. 1 is a diagram representing an equivalent circuit to a piezoelectric actuator according to the present invention, which is based on the force-voltage correspondence. The piezoelectric actuator has electrical input terminals 1 and 1' as an electrical circuit device, and mechanical output terminals 2 and 2' as a machine functioning device, and while it has the electrical circuit device in conjunction with the machine functioning device, they can be expressed as a single unified circuit or an equivalent circuit 20.

Capacity $C_d$ of a capacitor 21 deployed in parallel on the input side of the electrical system of FIG. 1 is called damping capacity. It is called damping capacity because capacitance value of the piezoelectric actuator when restricted is equal to this $C_d$. A trance on the right side of the damping capacity represents an ideal transformer 24 having a winding ratio of 1:A. A is called an electrical to mechanical conversion factor that has a dimension of N/V (N: Newton, V: Volt) and is used for mutual conversion of quantity of the electrical system and that of the mechanical system. The left side at the border of the ideal transformer 24 is the electrical system, which is a world that is measured based on electrical quantity in dimensions of voltage (V: volt), current (A: ampere), and electric charge (Q: coulomb), and the right side is the mechanical system, which is a world that is measured based on mechanical quantity in dimensions of displacement (m: meter) and force (N: Newton).

Moreover, compliance 22, which is an inverse of rigidity k of the piezoelectric actuator, is deployed serially on the mechanical system side. The dimension having the rigidity k is N/m (N: Newton, m: meter). Since the compliance, which is an inverse of k, corresponds to electrical capacitance, it is denoted as 1/k here in accordance with the dimension of the compliance.

Figure 2:
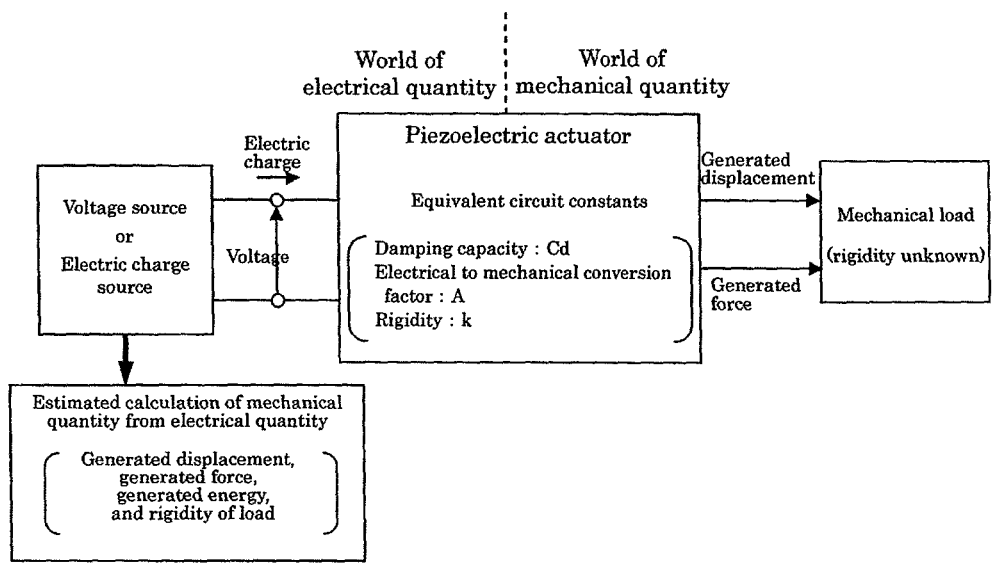
FIG. 2 is a diagram illustrating a configuration for estimating generated force, generated displacement, and the like using the equivalent circuit.

FIG. 2 is a diagram illustrating a configuration estimating generated force, generated displacement, and the like using the equivalent circuit. A method of determining three equivalent circuit constants of an actual piezoelectric actuator, and a method of calculating, from values of voltage and electrical quantity, generated displacement, generated force, and generated energy when a certain voltage or electric charge is applied to the piezoelectric actuator and then the electric charge flows into the piezoelectric actuator or the voltage generates therein as a result.

To begin with, find four terminal constants of the equivalent circuit of the piezoelectric actuator portion. These four terminal constants are fundamental to the entire present invention. In FIG. 1, the voltage between the electrical input terminals 1 and 1' of the piezoelectric actuator is denoted as $V_1$, and the electric charge flowing into it is denoted as $Q_1$. Meanwhile, the voltage between the mechanical output terminals 2 and 2' displays generated force in accordance with the force-voltage correspondence, and the electric charge flowing from the mechanical output terminals 2 and 2' indicates generated displacement also in accordance with the correspondence relation. The generated force corresponding to the voltage between the mechanical output terminals 2 and 2' is denoted as $f_2$, and the generated displacement corresponding to the electric charge flowing from the mechanical output terminals 2 and 2' is denoted as $\xi_2$.

The four terminal constants of the piezoelectric actuator portion are represented as the product of four terminal constants of the section of the damping capacity $C_d$, the section of the ideal transformer having the electrical to mechanical conversion factor, and the section of the serially deployed compliance (electrical capacitance 1/k) indicating mechanical rigidity. These relations are represented by Equation (1), and Equation (2) is obtained by calculating the product of the three items.

$$\begin{pmatrix} V_1 \\ Q_1 \end{pmatrix} = \begin{pmatrix} 1 & 0 \\ C_d & 1 \end{pmatrix} \cdot \begin{pmatrix} 1/A & 0 \\ 0 & A \end{pmatrix} \cdot \begin{pmatrix} 1 & k \\ 0 & 1 \end{pmatrix} \cdot \begin{pmatrix} f_2 \\ \xi_2 \end{pmatrix} \qquad (1)$$

$$= \begin{pmatrix} 1/A & k/A \\ C_d/A & C_d \cdot k/A + A \end{pmatrix} \cdot \begin{pmatrix} f_2 \\ \xi_2 \end{pmatrix} \qquad (2)$$

$V_1$ and $Q_1$ denote voltage and electric charge between the electrical input terminals 1 and 1', respectively, and $f_2$ and $\xi_2$ denote generated force and generated displacement at the mechanical output portion of the piezoelectric actuator, respectively.

Equations (3) and (4) are obtained if Equation (2) is represented by two equations:

$$V_1 = (1/A) \cdot f_2 + (k/A) \cdot \xi_2 \qquad (3)$$

$$Q_1 = (C_d/A) \cdot f_2 + (C_d \cdot k/A + A) \cdot \xi_2 \qquad (4)$$

Based on Equations (3) and (4), an equation for determining equivalent circuit constants of a target piezoelectric actuator is derived based on actual measured results for that piezoelectric actuator. Since there are the three equivalent circuit constants of $C_d$, A, and k, these equivalent circuit constants may basically be determined using three individual measured pieces of data.

As an exemplary method of determining the equivalent circuit constants, first measure generated displacements $\xi_f$ when the piezoelectric actuator is in a free state (zero load power), generated force $f_c$ when the piezoelectric actuator is in a fixed state (zero generated displacement), and quantity of inflow electric charge $Q_c$ when the piezoelectric actuator is in a fixed state (zero generated displacement), where applied voltage is denoted as $V_1$. These values are substituted into Equations (3) and (4) and the equivalent circuit constants $C_d$, A, and k are then calculated in the following manner. Note that a simple calculation method for quantity of inflow electric charge $Q_c$ is described later.

In the case where the piezoelectric actuator is in a free state, the generated force at the piezoelectric actuator tip is zero, namely corresponds to zero voltage between the mechanical output terminals 2 and 2' according to the force-voltage correspondence. Assuming $f_2$ is zero, Equation (5) is obtained by substituting 0 for $f_2$ in Equation (3), where voltage applied to the piezoelectric actuator is $V_1$ and displacement on the mechanical terminal side is $\xi_f$.

$$V_1 = (k/A) \cdot \xi_f \qquad (5)$$

In the case where the piezoelectric actuator is in a fixed state, the generated displacement at the piezoelectric actuator tip is zero, namely corresponds to zero electric charge between the mechanical output terminals 2 and 2' according to the force-voltage correspondence. In the case where the generated displacement $\xi_2$ is zero, Equations (6) and (7) are obtained by substituting 0 for $\xi_2$ in Equations (3) and (4), where voltage is $V_1$, electrical quantity is $Q_c$, and generated force on the mechanical terminal side is $f_c$.

$$V_1 = (1/A) \cdot f_c \qquad (6)$$

$$Q_c = (C_d/A) \cdot f_c \qquad (7)$$

Equation (8) is obtained by eliminating $V_1$ from Equations (5) and (6). In other words, rigidity k of the piezoelectric actuator may be calculated as a ratio of generated force $f_c$ of the piezoelectric actuator in a fixed stated to generated displacement $\xi_f$ of the piezoelectric actuator in a free state.

$$k = f_c/\xi_f \qquad (8)$$

Moreover, Equation (9) is obtained by modifying Equation (6). In other words, electrical to mechanical conversion factor A may be calculated as a ratio of generated force $f_c$ to applied voltage $V_1$ of the piezoelectric actuator in a fixed stated.

$$A = f_c/V_1 \qquad (9)$$

Furthermore, Equation (10) is obtained by substituting Equation (9) for Equation (7) and eliminating A therefrom. In other words, damping capacity $C_d$ may be found as a ratio of quantity of inflow electric charge $Q_c$ to applied voltage $V_1$ when the piezoelectric actuator is in a fixed state.

$$C_d = Q_c/V_1 \qquad (10)$$

When the equivalent circuit constants $C_d$, A, and k of the piezoelectric actuator are determined through the above steps, generated displacement and generated force of the piezoelectric actuator may be estimated based on the applied voltage and quantity of inflow electric charge in a state where a mechanical load is applied to the piezoelectric actuator. The estimation steps are described below.

Estimating generated displacement and generated force of the piezoelectric actuator corresponds to creating equations with reversed relationship of electrical input and mechanical output. In other words, it is synonymous to making an inverse matrix of Equation (2), and the result of calculating the inverse matrix is as in Equations (11) and (12).

$$\begin{pmatrix} f_2 \\ \xi_2 \end{pmatrix} = \begin{pmatrix} 1/A & k/A \\ C_d/A & C_d \cdot k/A + A \end{pmatrix}^{-1} \cdot \begin{pmatrix} V_1 \\ Q_1 \end{pmatrix} \qquad (11)$$

$$= \begin{pmatrix} C_d \cdot k/A + A & -k/A \\ -C_d/A & 1/A \end{pmatrix} \cdot \begin{pmatrix} V_1 \\ Q_1 \end{pmatrix} \qquad (12)$$

Equations (13) and (14) are obtained by writing Equation (12) in two equations.

$$f_2 = (C_d \cdot k/A + A) \cdot V_1 - (k/A) \cdot Q_1 \qquad (13)$$

$$\xi_2 = -(C_d/A) \cdot V_1 + (1/A) \cdot Q_1 \qquad (14)$$

In Equations (13) and (14), since the values of $C_d$, A, and k, which are equivalent circuit constants, have already been determined through the aforementioned steps, it is understood that $f_2$ and $\xi_2$ may be promptly estimated by merely measuring the voltage $V_1$ and the quantity of inflow electric charge $Q_1$ at that time. Moreover, it is understood that generated force $f_2$ and generated displacement $\xi_2$ may be estimated independently of rigidity K of the target object since the rigidity K does not appear in the calculating formula.

Furthermore, estimation of mechanical energy applied to the target object as a product of the generated force and the generated displacement is possible from the above results, and the calculating formula is given in Equation (15).

$$E = 1/2 \cdot f_2 \cdot \xi_2 \qquad (15)$$

$$= 1/2 \cdot (Q_1 - C_d \cdot V_1) \cdot \{(C_d \cdot k/A^2 + 1) \cdot V_1 - k \cdot Q_1/A^2\}$$

In order to estimate the rigidity K of the target object, the ratio of Equation (13) to Equation (14) should be taken. The relationship ($K = f_2/\xi_2$) of $f_2$, $\xi_2$, and K is apparent from the fact that the compliance 23 (electrical capacitance 1/K) is deployed serially on the right side of the mechanical output terminals 2 and 2' of FIG. 1. Accordingly, the calculating formula for the rigidity K is as given in Equation (16).

$$K = \{(C_d \cdot k + A^2) \cdot V_1 - k \cdot Q_1\}/(-C_d \cdot V_1 + Q_1) \qquad (16)$$

Figure 3:
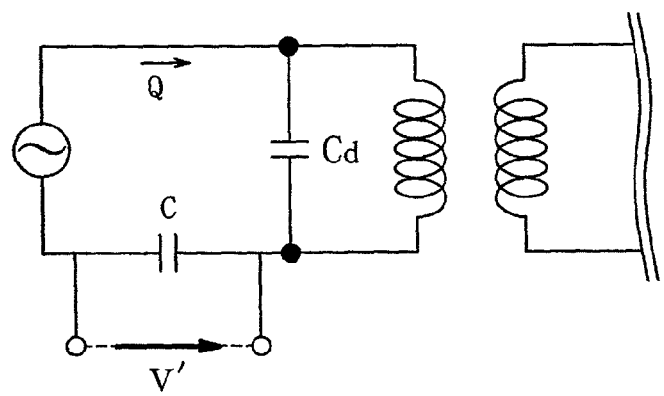
FIG. 3 is a diagram illustrating a circuit of an electric charge measuring device using a capacitor.

While a method of calculating a current value and integrating it is typical for measuring electrical quantity flowing into a piezoelectric actuator, a simpler exemplary measuring method is given. FIG. 3 is a diagram illustrating a circuit of an electrical quantity measuring device using a capacitor. Its configuration includes a capacitor (electrical capacitance C) that has a sufficiently greater capacitance than the damping capacity $C_d$ and that is connected in series to the piezoelectric actuator, which is connected to a power source, and a device for measuring terminal voltage V' of the capacitor. With this kind of circuit, electrical quantity Q (=C·V') may be calculated from the measured voltage V' and electrical capacitance C. Note that the electrical quantity measuring method does not always need to use such a device, and other devices capable of measuring electrical quantity may be available.

A solution for when the piezoelectric actuator has a hysteresis is described next. Hysteresis of the piezoelectric actuator is a phenomenon where generated displacement differs when voltage rises and falls, even if the same voltage is applied to the piezoelectric actuator. While this is the case of a constant voltage magnitude, in general terms, it results in the generated displacement dependent on experienced applied voltage record.

It is difficult to solve the hysteresis phenomenon of the piezoelectric actuator in a typical case, however, when the applied voltage with a constant width is repeatedly used, it may be solved by pre-measuring the equivalent circuit constants as functions of the applied voltage at the time the voltage rises from zero to the maximum voltage, and storing the equivalent circuit constants as functions of the applied voltage, and pre-measuring the equivalent circuit constants as functions of the applied voltage at the time the voltage falls from the maximum voltage to zero, and storing the equivalent circuit constants as functions of the applied voltage.

Figure 4:
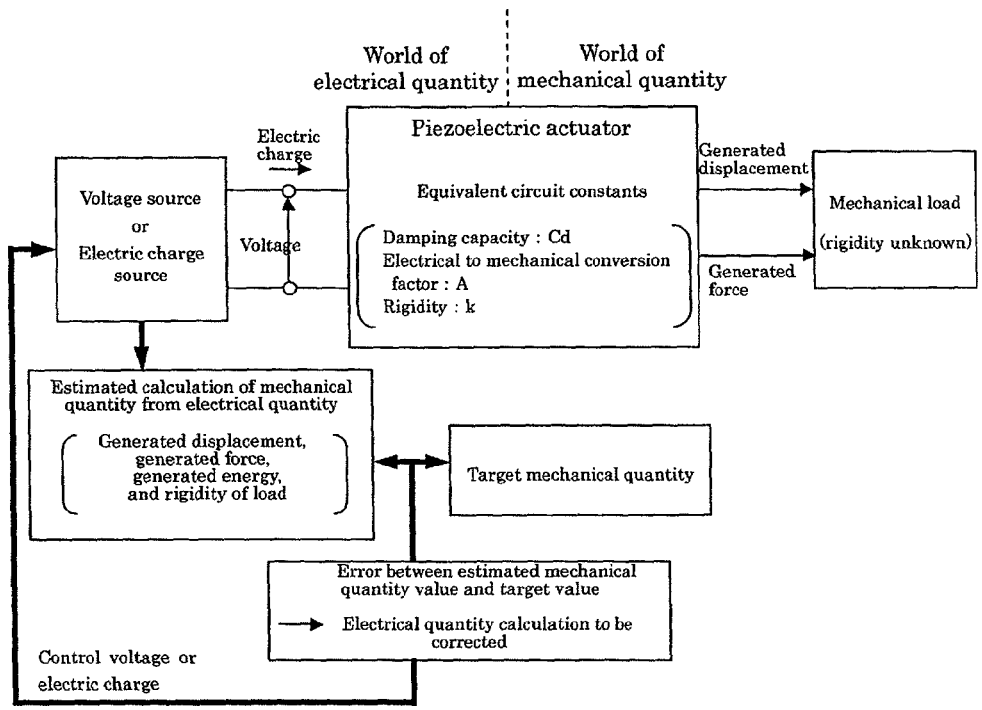
FIG. 4 is a diagram illustrating a configuration for controlling the generated force, generated displacement, and the like estimated using the equivalent circuit.

FIG. 4 is a diagram illustrating a configuration for controlling the generated force, generated displacement, and the like estimated using the equivalent circuit. As such, if the applied voltage and the electrical quantity are adjusted while force and displacement generated by the piezoelectric actuator and applied to the target object are measured and evaluated minutely, it is possible to apply target force and displacement to the target object. As a result, it is possible to repeatedly transform the target object at a fixed amplitude, and continuously apply a fixed force. In other words, force and displacement applied to the target object may be quantitatively controlled by only changing the applied voltage or the electrical quantity. Moreover, since values of both force and displacement may be simultaneously measured and evaluated, rigidity of the target object may be measured and evaluated from Equation (16). This allows easy determination of whether the target object is damaged, or whether the actuator is properly making contact with the target object. Furthermore, since mechanical energy generated from the piezoelectric actuator and to be applied to the target object may be measured and evaluated from Equation (15), control based on the value of the mechanical energy is possible.

Figure 5:
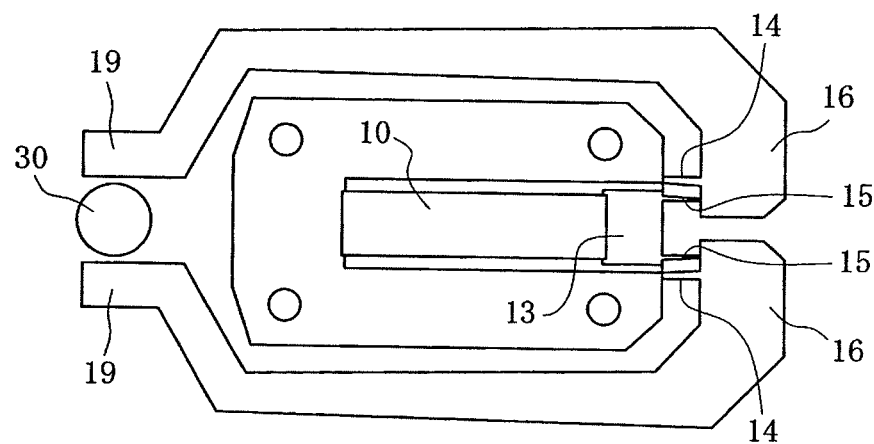
FIG. 5 shows an exemplary piezoelectric actuator configured as a clamping mechanism, where 5(a) shows a state where a voltage is not applied to a multilayer piezoelectric actuator, and 5(b) shows a state of pinching a target object by applying a voltage to the multilayer piezoelectric actuator.
Figure 5:
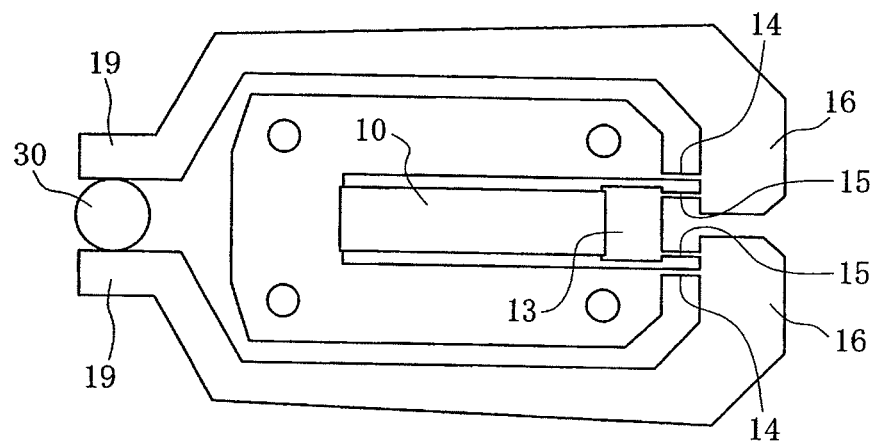

FIG. 5 illustrates an exemplary piezoelectric actuator structured as a clamping mechanism, which is an embodiment of the piezoelectric actuator using a control method given above. This piezoelectric actuator includes a device for applying a voltage to the piezoelectric actuator and measuring electrical quantity flowing into the piezoelectric actuator as a result of the applied voltage, or a device for applying an electric charge to the piezoelectric actuator and measuring voltage applied to the piezoelectric actuator as a result of the applied electric charge; it therefore may implement a movement of pinching an object based on a condition such as a generated predetermined displacement or a generated force without using a mechanical sensor. FIGS. 5(a) shows a state where a voltage is not applied to a multilayer piezoelectric actuator, and 5(b) shows a state of pinching a target object by applying a voltage to the multilayer piezoelectric actuator. In other words, while the target object is not being pinched in the state of FIG. 5(a), in FIG. 5(b), a target object 30 may be pinched by extending a piezoelectric element 10 by applying a voltage, exerting pressure on a contact member 13, moving an arm 16 via hinges 14 and 15, and narrowing distance between pinch holders 19.

At this time, according to the present invention, even if the rigidity of the target object 30 to be pinched and held is unknown, the target object 30 may be pinched and held by a desired generated force, generated displacement or generated mechanical energy if electrical quantity and applied voltage are measured, and the applied voltage is adjusted while the generated force, the generated displacement, and the mechanical energy are measured and evaluated minutely. Since this allows pinching and holding without applying excessive force or displacement, damage of the target object 30 may be prevented. Moreover, even if it is damaged, rigidity of the target object 30 may be easily measured and evaluated, and thus the fact that it has been damaged may be discovered immediately. In other words, whether the relationship of the actuator and the target object 30 is normal may always be easily understood.

Furthermore, since a mechanical sensor is not required, a simple configuration of the pinch holders 19 is possible, which is effective in downsizing and weight saving. In addition, even when checking operations of equipment before use, while checking operations of both a sensor and an actuator is necessary in the conventional cases of using the sensor, the present invention having the sensor and the actuator integrated as one device allows relatively easy checking of the operations thereof.

In the case of controlling a piezoelectric actuator using the method described above, a control device having the piezoelectric actuator, a circuit to be connected to a power supply, and a device for measuring electrical quantity flowing into the piezoelectric actuator as illustrated in FIG. 3 may be available.

The mechanical output measurement evaluation method and the control method according to the present invention are particularly effective when the relationship between the piezoelectric actuator and a target object needs to be closely managed, or when a simple structure is required. Moreover, the present invention may be applied to various structured piezoelectric actuators without being limited to the piezoelectric actuator that pinches a target object.

Figure 6:
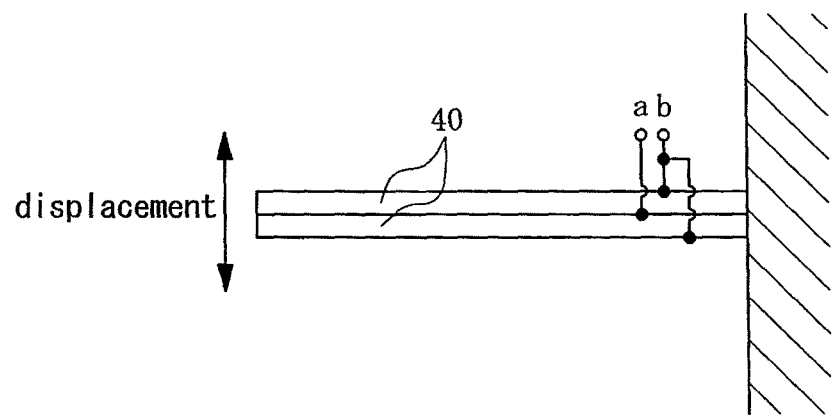
FIG. 6 illustrates a bimorph piezoelectric actuator.

FIG. 6 is a diagram illustrating a bimorph piezoelectric actuator to which the present invention, is applicable. As shown in FIG. 6, it is structured with two piezoelectric plates 40 adhered together to allow generation of distortion along the length thereof in mutually opposite directions, and a voltage is applied between terminals a and b such that lateral displacement is generated according to the bimetal principle. This type of piezoelectric actuator is capable of generating a relatively large displacement with little generated force.

Figure 7:
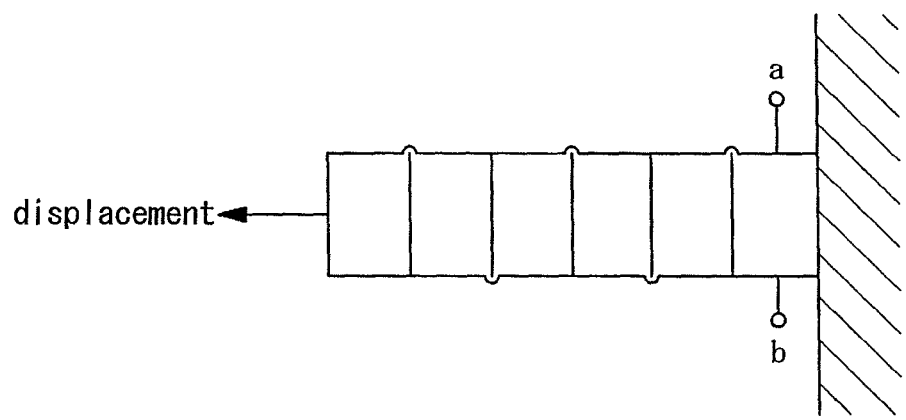
FIG. 7 illustrates a multilayer piezoelectric actuator.

FIG. 7 is a diagram illustrating a multilayer piezoelectric actuator which the present invention is applicable. Formation of multiple inner electrodes along the length and application of a voltage between the terminals a and b allows generation of axial displacement. In the case of the multilayer piezoelectric actuator, generated displacement is from several micrometers to several tens of micrometers, which is small, but has an extremely large generated force.

Figure 8:
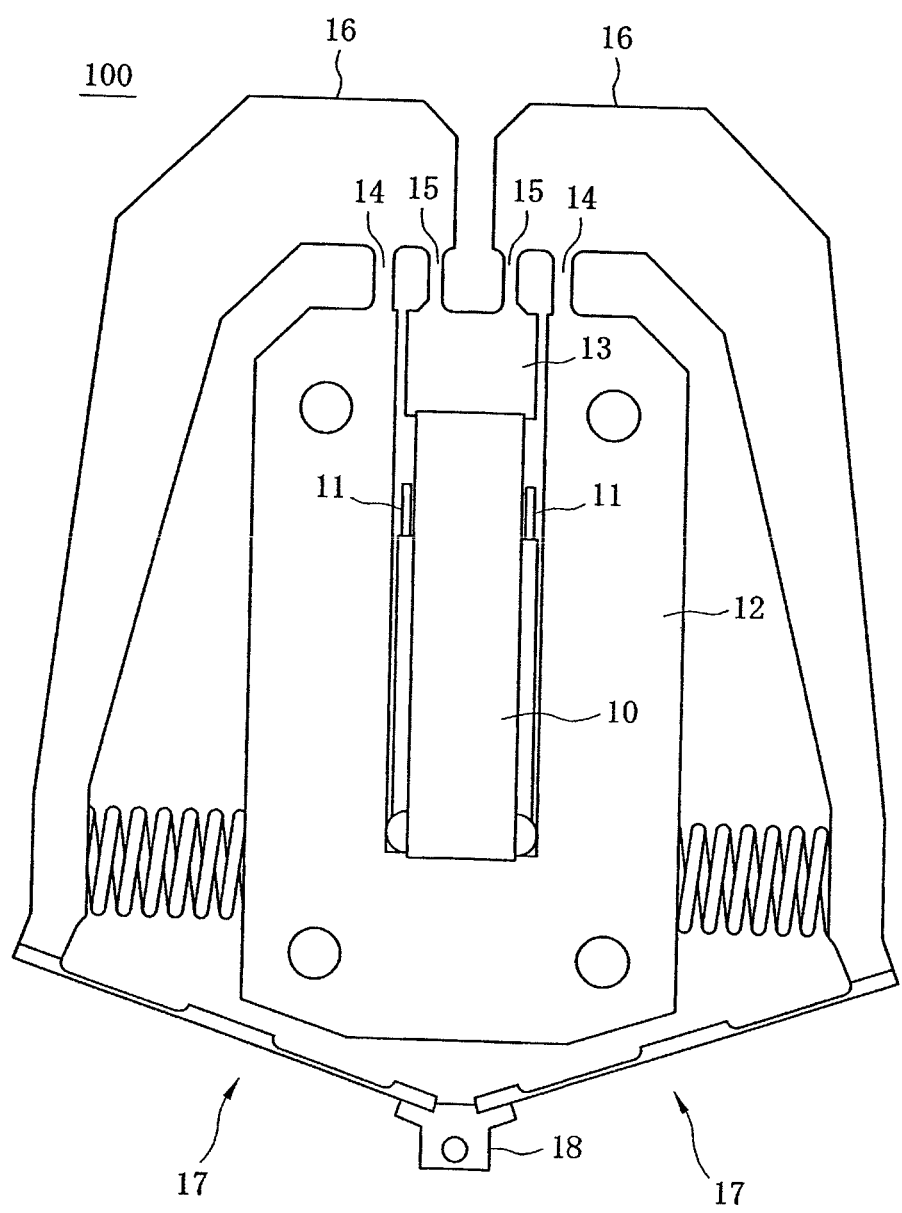
FIG. 8 illustrates an exemplary piezoelectric actuator having a displacement increasing mechanism.

FIG. 8 is a diagram illustrating a piezoelectric actuator to which the present invention is applicable having a displacement increasing mechanism. As a specific configuration of the displacement increasing mechanism, a multilayer piezoelectric actuator 10 is mounted between a first contact member 12 connected to the first end of the multilayer piezoelectric actuator 10 along the length thereof and a second contact member 13 connected to the other end of the multilayer piezoelectric actuator 10. Moreover, axial displacement of the multilayer piezoelectric element 10 occurs by applying a voltage between electric terminals 11 and 11. It is possible to transmit this generated displacement to the arm 16 via the hinges 14 and 15, and apply increased quantity of the displacement to a center piece 18, which makes contact with the target object via a plate spring 17 attached to the tip of the arm 16. The generated displacement of the multilayer piezoelectric element 10 used as a driving source for a piezoelectric actuator 100 is small, as described above. The quantity of displacement at the center piece 18 making contact with the target object, however, is increased to be several ten times of the generated displacement of the piezoelectric element 10 by using the increasing mechanism.

Furthermore, application of the present invention allows implementation of a simple rigidity monitoring device. For example, a hardness meter for measuring hardness of rubber, measuring hardness of living organ, and measuring looseness of a tooth affected by gum disease are basically nothing other than measuring rigidity. Rigidity of the target object that the piezoelectric actuator makes contact may be estimated from values of voltage and electrical quantity using the present invention as described above. In addition, a simple rigidity monitoring device may be implemented since sensors for mechanical quantity such as a displacement sensor or a force sensor are not required. Moreover, this rigidity monitoring device includes a piezoelectric actuator, and a device for applying a voltage to the piezoelectric actuator and measuring electrical quantity flowing into the piezoelectric actuator due to the applied voltage or a device for applying an electric charge to the piezoelectric actuator and measuring quantity of voltage applied to the piezoelectric actuator due to the applied electric charge. The shape of the piezoelectric actuator portion may be formed so as to make an end of the piezoelectric actuator or the center piece of the displacement increasing mechanism shown in FIG. 8 contact the target object, or it may be formed to pinch and hold the target object by the clamping mechanism shown in FIG. 5.

DESCRIPTION OF REFERENCE NUMERALS 1, 1': electric input terminal
2, 2': mechanical output terminal
20: equivalent circuit
21: capacitor
22, 23: compliance
24: ideal transformer
30: target object
V, $V_1$: applied voltage
Q, $Q_1$: electrical quantity flowing through piezoelectric actuator
$C_d$: damping capacity A: electrical to mechanical conversion factor
k: rigidity of piezoelectric actuator
K: rigidity of target object
f, $f_2$: force applied on target object (corresponds to voltage between mechanical output terminals 2 and 2')
$\xi$, $\xi_2$: displacement given to target object (corresponds to electrical quantity between mechanical output terminals 2 and 2')
E: mechanical energy applied to target object

The invention claimed is:

1. A mechanical output measurement and evaluation method for a piezoelectric actuator that mechanically expands and contracts to deform in response to applied voltage or electric charge utilizing the piezoelectric effect or the electrostrictive effect, comprising the steps of:
    finding equivalent circuit constants of the piezoelectric actuator including damping capacity, rigidity, and an electrical to mechanical conversion factor;
    applying a voltage to the piezoelectric actuator and measuring electrical quantity flowing into the piezoelectric actuator due to the applied voltage, or applying an electric charge to the piezoelectric actuator and measuring voltage applied to the piezoelectric actuator due to the applied electric charge; and
    measuring and evaluating one or more of force, displacement, or mechanical energy generated by the piezoelectric actuator and applied to a target object, or rigidity of a target object using the equivalent circuit constants, the applied voltage, and the electrical quantity.

2. The mechanical output measurement and evaluation method for the piezoelectric actuator of claim 1, wherein in the step of finding the equivalent circuit constants of the piezoelectric actuator, the equivalent circuit constants are found by being defined as a function of applied voltage applied to the piezoelectric actuator rising from zero, or a function of applied voltage to the piezoelectric actuator falling from a maximum voltage.

3. The mechanical output measurement and evaluation method for the piezoelectric actuator of claim 1, wherein in the step of measuring and evaluating one or more of force, the displacement, or the mechanical energy generated by the piezoelectric actuator and applied to the target object, or the rigidity of the target object, equation $f=(C_d \cdot k/A+A) \cdot V - k \cdot Q/A$ is used for the force, equation $\xi=(Q-C_d \cdot V)/A$ is used for the displacement, equation $E=\frac{1}{2} \cdot (Q-C_d \cdot V) \cdot \{(C_d \cdot k/A^2+1) \cdot V - k \cdot Q/A^2\}$ is used for the mechanical energy, and equation $K=\{(C_d \cdot k+A^2) \cdot V - k \cdot Q\}/(-C_d \cdot V+Q)$ is used for the rigidity of the target object;

wherein f denotes force generated by the piezoelectric actuator and applied to the target object, $\xi$ denotes the displacement generated by the piezoelectric actuator and applied to the target object, E denotes the mechanical energy generated by the piezoelectric actuator and applied to the target object, K denotes the rigidity of the target object, V denotes the applied voltage, Q denotes the electrical quantity flowing into piezoelectric actuator, $C_d$ denotes the damping capacity, k denotes the rigidity of piezoelectric actuator, and A denotes the electrical to mechanical conversion factor.

4. A piezoelectric actuator control method comprising: measuring and evaluating any one of force, displacement, or mechanical energy generated by the piezoelectric actuator and applied to a target object, or rigidity of the target object minutely, and controlling an applied voltage and electrical quantity such that the force, the displacement and the mechanical energy become desired values while changing the applied voltage and the electrical quantity according to the mechanical output measurement and evaluation method for the piezoelectric actuator of claim 1.

5. The piezoelectric actuator control method of claim 4, wherein the piezoelectric actuator is structured so as to make a move of pinching an object in association with voltage or electric charge applied.

6. A clamping device for pinching a target object using the piezoelectric actuator control method of claim 5, comprising a piezoelectric actuator, and a device for applying a voltage to the piezoelectric actuator and measuring electrical quantity flowing into the piezoelectric actuator due to the applied voltage, or a device for applying an electric charge to the piezoelectric actuator and measuring quantity of voltage applied to the piezoelectric actuator due to the applied electric charge.

7. A rigidity monitoring device, comprising a piezoelectric actuator, and a device for applying a voltage to the piezoelectric actuator and measuring electrical quantity flowing into the piezoelectric actuator due to the applied voltage, or a device for applying an electric charge to the piezoelectric actuator and measuring quantity of voltage applied to the piezoelectric actuator due to the applied electric charge; wherein an end of the piezoelectric actuator makes contact with a target object, or the target object is pinched and held when the piezoelectric actuator makes a move of pinching the target object while a voltage or an electric charge is applied to the piezoelectric actuator, and rigidity of the target object is measured and evaluated using the mechanical output measurement and evaluation method of claim 1.

* * * * *